Feb. 9, 1932.  A. B. RYPINSKI  1,844,409
JOINT
Filed Oct. 27, 1928  3 Sheets-Sheet 1
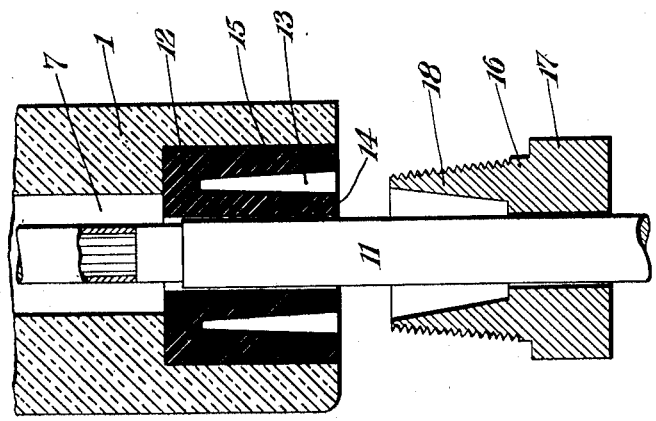
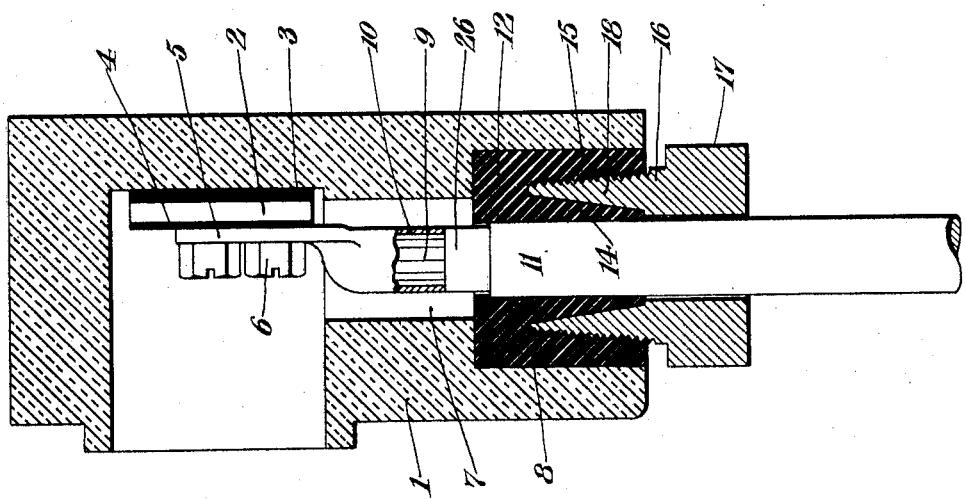
INVENTOR.
Albert B. Rypinski
BY
D. Anthony Usina ATTORNEY Feb. 9, 1932. A. B. RYPINSKI 1,844,409
JOINT
Filed Oct. 27, 1928   3 Sheets-Sheet 2
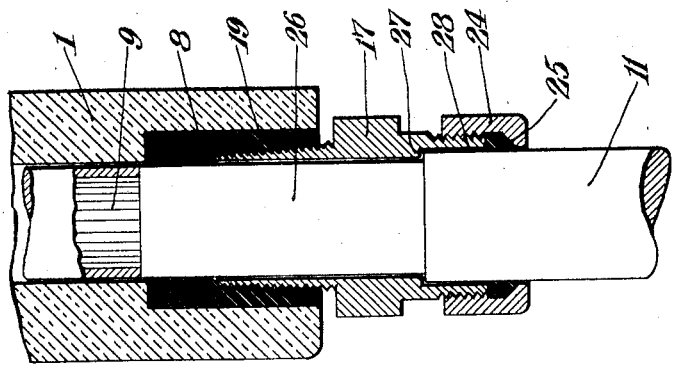
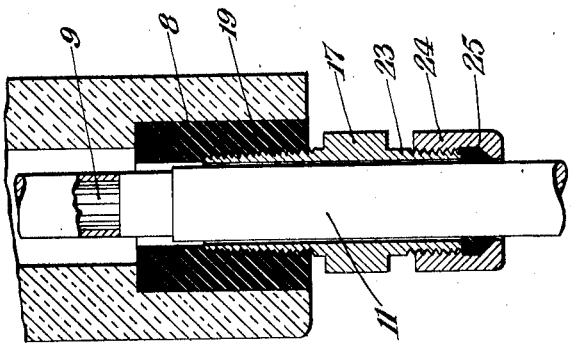
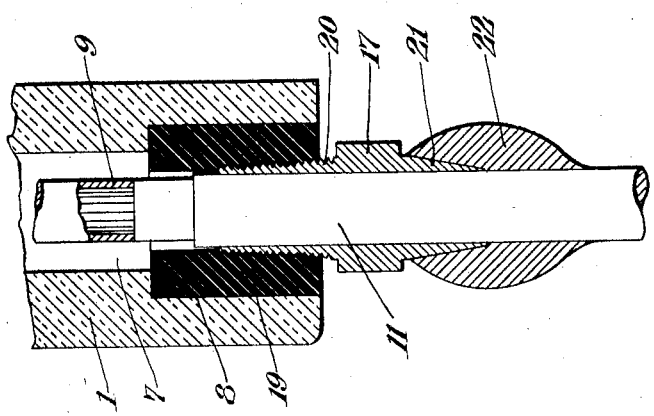
INVENTOR.
Albert B. Rypinski
BY
D. Anthony Ulina ATTORNEY

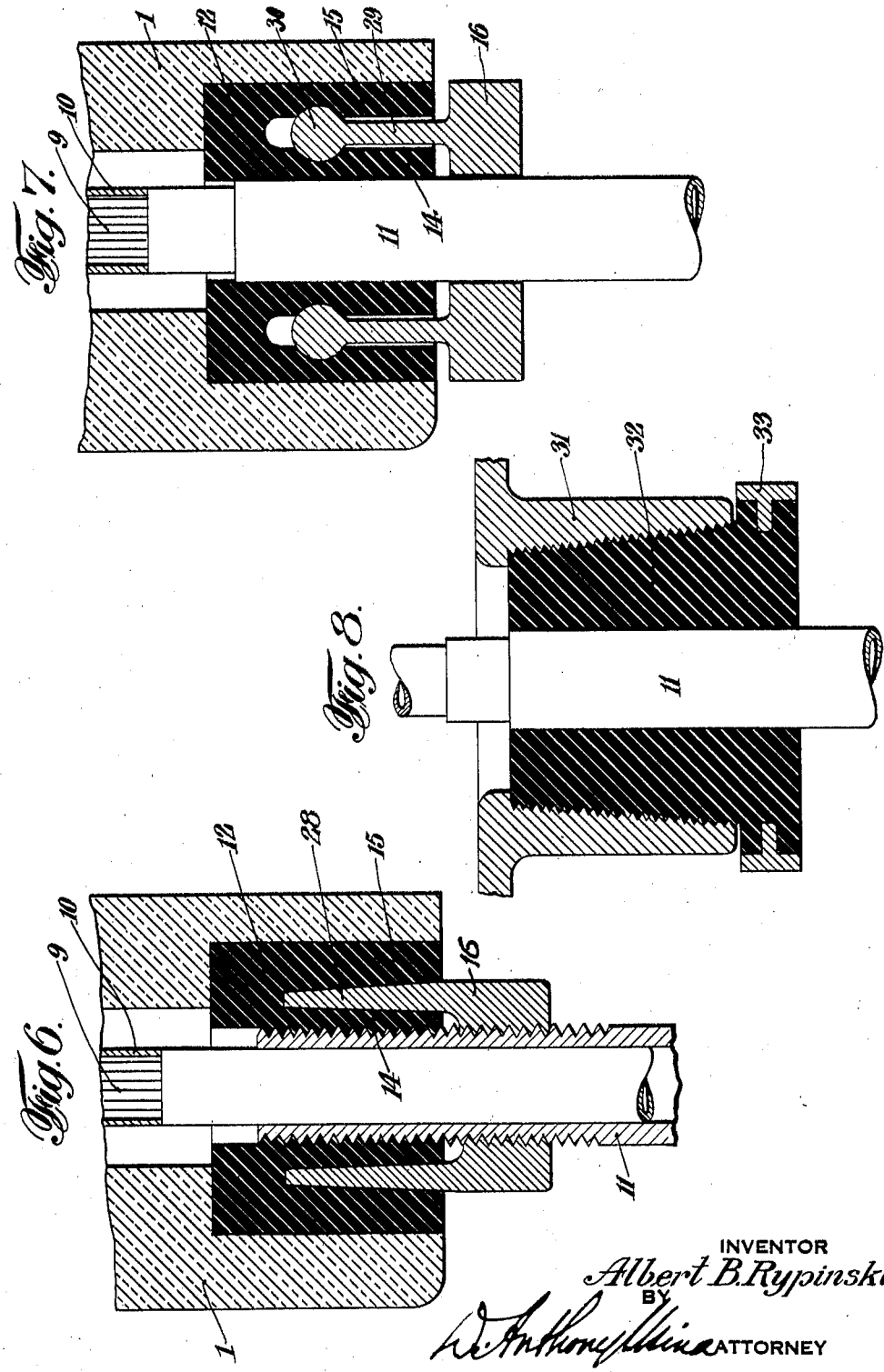

Patented Feb. 9, 1932

1,844,409

UNITED STATES PATENT OFFICE

ALBERT B. RYPINSKI, OF LAURELTON, LONG ISLAND, NEW YORK, ASSIGNOR, BY MESNE ASSIGNMENTS, TO METROPOLITAN DEVICE CORPORATION, A CORPORATION OF NEW YORK

JOINT

Application filed October 27, 1928. Serial No. 315,469.

Where an electric cable enters an opening in a surrounding wall as for example in connection blocks in subway systems, it is important to make a joint between the cable and the wall which is waterproof and insulating, and which will maintain these characteristics over a period of use. Such joints have been made by packing oakum or cork around the end of the sheathed cable or by driving lead floss into the socket around it as for example in Murray Patent No. 1,028,257 of June 4, 1912. Similar joints are desirable in many cases in which other objects than electrical cables enter a socket in a surrounding wall.

The present invention provides improvements in such joints, and is especially important in connection with electrical conductors of the lead sheathed type.

Fig. 1 is a longitudinal section of a joint embodying the invention;

Fig. 2 is a similar view of the parts before the joint is made;

Figs. 3 to 8 are views similar to Fig. 1 illustrating modifications.

A connection block 1 of porcelain or other refractory insulating material carries a bus 2 extending transversely and bearing against an insulating plate 3. A similar insulating plate 4 overlies the bus and upon this is a connecting lug 5 of a branch cable fastened and connected to the bus by screws 6. The branch cable enters through a lateral opening 7 at the outer end of which is an enlarged socket 8.

The wires 9 are surrounded at their ends by a metal sleeve 10 which terminates in the lug 5. Back of the sleeve 10 the cable is enclosed in the usual lead sheath 11. The purpose of the invention is to pack the end of the cable where it enters an opening in such connecting blocks or similar supports, and to make the connection waterproof as well as insulating.

A bushing 12 of soft rubber is fitted easily over the end of the sheathed portion of the cable and fits easily into the enlargement or socket 8 in the block, as in Fig. 2. An annular recess 13 is provided in the bushing, preferably tapered slightly and extending nearly to the inner end, leaving an inner ring 14 and an outer ring 15.

A metal sleeve 16 has its outer end 17 shaped to receive a wrench and its inner end formed into a ring 18 tapered in cross section to a greater extent than the recess 13 and threaded so that it can be screwed into the soft rubber to the position of Fig. 1.

As the metal sleeve is screwed into place, the rubber ring 15 is pressed outward against the surrounding support and the ring 14 pressed inwardly against the lead sheath. A watertight joint is thus obtained around the sheath of the cable and around the face of the socket 8, the upper portion of the bushing 12 cutting off any possible passage of water from the metal sleeve into the block. The threads will bite easily into the rubber and draw the metal sleeve into the position of Fig. 1.

According to Fig. 3, a soft rubber bushing 19 is used having its central opening somewhat larger than the lead sheath 11. The metal sleeve 20 fits around the lead sheath and has a tapered outer face engaging the inside of the rubber sleeve and threaded so as to be screwed into the latter and to expand it against the face of the socket 8.

In this case a separate tight connection must be made about the sheathed cable. For that purpose the metal sleeve has a tapered extension 21 on its lower end, and a wiped joint 22 is made between this extension and the cable.

The construction of Fig. 4 is similar except that the extension 23 of the outer end of the metal sleeve is threaded to receive a gland 24 which compresses packing material 25 against the lead sheath 11 and the end of the metal sleeve, to close the space between the two.

Fig. 5 illustrates an arrangement where the lead sheath is too large to enter the socket 8. The sheath 11 is cut away, leaving the usual internal rubber and fabric insulation 26 within the socket. The metal sleeve is shaped with a shoulder 27 forming an enlarged threaded socket 28 at the end fitting the sheath 11. The inner end of the metal sleeve screws into and expands the soft rubber bushing 19 to pack the space between the sleeve and the socket 8. A gland 24 and packing 25 serve to pack the space between the sleeve and the sheath.

According to Fig. 6 the lead armor 11 of the cable is threaded. The bushing 12 has an annular groove dividing the outer portion of it into two rings 14 and 15. The metal sleeve 16 has a ring-shaped portion 28 tapered on either or both faces entering the groove in the bushing, and has a threaded outer end fitting on the sheath 11. By turning up the metal bushing, therefore, the threads force the wedge-shaped ring 28 into the slot in the rubber bushing and expand the latter.

According to Fig. 7 the rubber bushing 12 is again provided with an annular recess dividing its outer end into two spaced rings 14 and 15. The metal bushing 16, however, has an expanding ring 29 with an enlargement 30 on its forward end so as to resist withdrawal. This metal bushing may be simply pushed into place and will be held there by the locking engagement of its enlarged edge 30 with the rubber.

In Fig. 8 the wall 31 through which the cable is to pass has its recessed portion tapered and also threaded; and the rubber bushing 32 is screwed into the recess, the tapered thread serving to force the rubber bushing inward and at the same time to compress it against the cable. The outer end of the bushing is preferably stiffened by a reinforcing metal ring 33 having an internal flange embedded in the rubber. Various other methods may be used for reinforcing the head and other parts of the bushing. This reinforcement leaves the bushing free to flex but hardens or stiffens it where a wrench or similar tool is to be applied. The reinforcing metal may be internal to the rubber or external, as shown. Or a similar result can be secured by vulcanizing the outer end.

The joint may be applied to a great variety of structures in which the cable has to pass through an opening in an insulating structure. For example, instead of the connection block of Fig. 1, two joints of the styles described may be made at opposite ends of a metal sleeve enclosing a straight junction between the ends of two cables such as commonly occurs in manholes in the street on underground distribution systems. Or, such joints may be applied where the cable enters the metal casing of junction boxes, transformers, potheads or other appliances used in electrical installations. The rubber bushing itself insulates the cable from such metal casings.

There is little skill required in assembling the rubber-bushed job. With the unit mounted on a wall, as it usually is, and the cable in place, it is not easy to pack oakum or floss at the back of the cable; especially where there are a number of cables close together each running into an opening in the unit or junction block. With the present rubber sleeve arrangement the joint can be manipulated from the front with a wrench.

The rubber bushings serve several useful functions. Besides being insulators, they fit the rough porcelain or metal of the surrounding wall and enter the inequalities of the surface and thus make a joint which is tight against the passage of water or oil. The resilient nature of the rubber makes it an improvement over lead and similar packings. It flexes and yields to expansion and contraction of the parts without destroying the seal, and returns to its original shape when permitted. In fact it can be easily removed and replaced, whereas it is very difficult to remove packed lead floss and oakum.

The adjacent wall or part being threaded, the rubber may be preformed with corresponding threads, or it may be plain so that the threads on the rubber are formed by screwing it into the threaded metal or porcelain. The threads serve to retain the parts in adjusted position, or other retaining means may be used as described.

Instead of using rubber, we may use bushings made of various rubber compositions or various other resilient materials. And the joint may be used with advantage not only for electrical conductors but wherever such a joint is required between a surrounding wall and an object such, for example, as a pipe, bar or other shaped object, which enters an opening in the wall.

Various modifications may be made by those skilled in the art without departing from the invention as defined in the following claims.

I claim:

1. A joint for a metal sheathed conductor comprising a support of insulating material having a socket in which the conductor is located, a soft rubber bushing within the socket having an annular groove and a metal sleeve having a tapered portion threaded in said groove and compressing the bushing in the space between the sleeve and the wall of the socket and in the space between the sleeve and the conductor.

2. A joint for a metal sheathed conductor comprising a support of insulating material having a socket in which the conductor is located, a rubber bushing in said socket and a tapered metal sleeve threaded and screwed into said bushing so as to compress the same laterally.

3. A joint for a conductor comprising a support of insulating material having a socket in which the conductor is located, a resilient rubber bushing within the socket having an annular groove, and a metal sleeve having means in said annular groove to compress said bushing laterally and to secure said sleeve in said groove.

4. A joint for a metal sheathed conductor comprising a support of insulating material having a socket in which the conductor is located, a rubber bushing in said socket and a sleeve entering and being secured in said bushing and compressing said bushing laterally.

5. A joint for a metal sheathed conductor comprising a support of insulating material having a socket in which the conductor is located, a metal sleeve surrounding the conductor and lying partly within the socket, the portion of the metal sleeve within the socket being tapered and compressing the bushing against the wall of the socket and being secured in said bushing.

6. A joint for a conductor comprising a socket and a mass of insulating material therein and about said conductor and means engaging and interlocking with said insulating material and wedging and compressing said insulating material laterally against the side wall of said socket and of said conductor.

In witness whereof, I have hereunto signed my name.

ALBERT B. RYPINSKI.